Patented Apr. 3, 1951

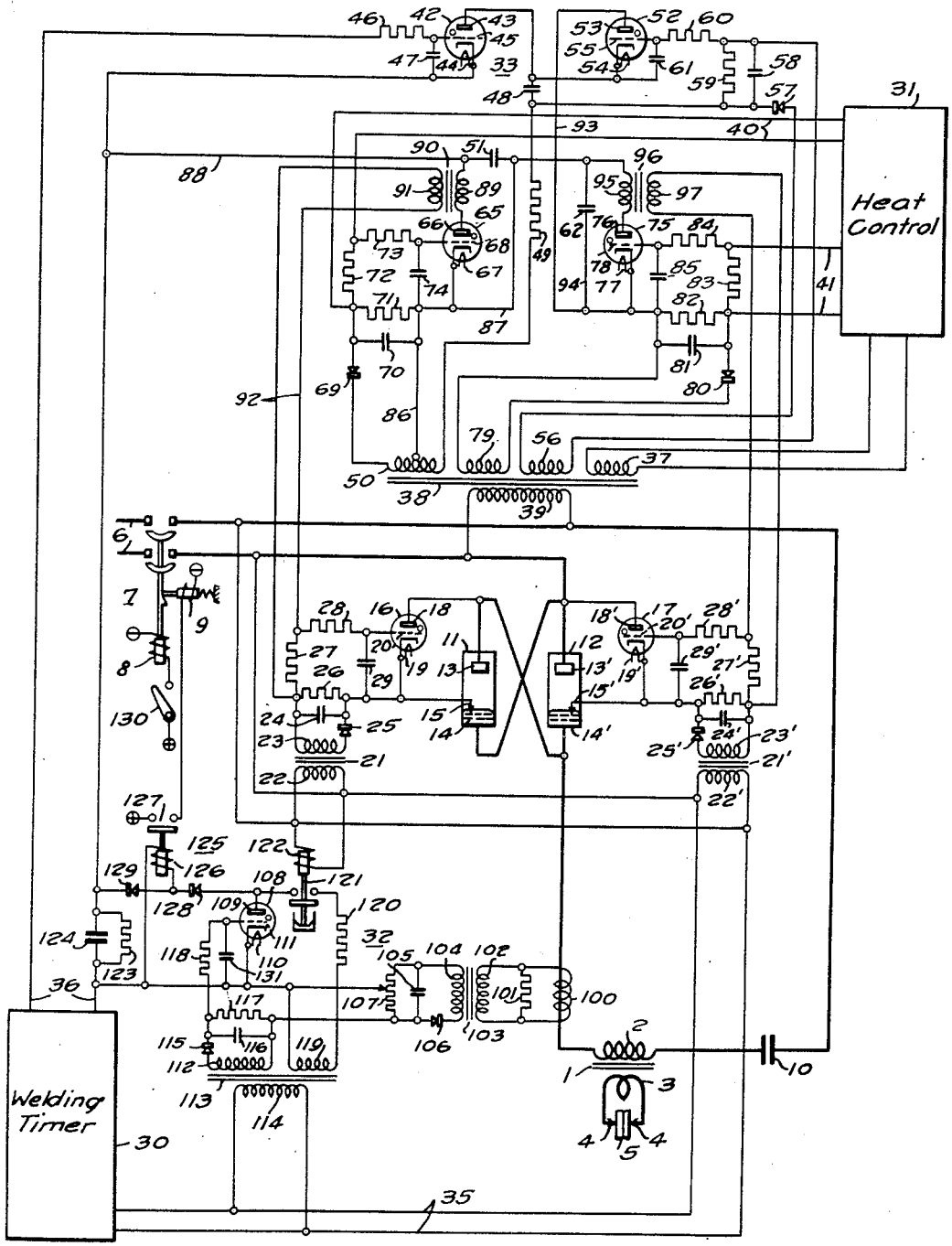

2,547,228

UNITED STATES PATENT OFFICE 2,547,228

SERIES CAPACITOR PROTECTION

James B. Owens, Pittsburgh, Pa., and William E. Large, Tonawanda, N. Y., assignors to Westinghouse Electric Corporation, East Pittsburgh, Pa., a corporation of Pennsylvania Application October 7, 1946, Serial No. 701,844

6 Claims. (Cl. 175—294)

1

The present invention relates to the protection of series capacitors against dangerous overvoltages and, more particularly, to the protection of capacitors connected in series with resistance welding machines.

Resistance welding machines have relatively high inductive reactance, as compared to the resistance of the circuit, including the work, and, therefore, operate at a low power factor. Thus, resistance welders have a high kva. demand and draw a relatively high line current, even though the actual power consumed may be relatively low. Furthermore, these machines operate intermittently, so that the line current fluctuates rapidly. This results in rapid and sharp fluctuations of the line voltage, which has highly objectionable effects, such as flickering of lamps supplied from the same circuit and unsatisfactory operation of other machines on the same line.

In order to avoid, or minimize, these objectionable effects, it is common practice to connect a capacitor in series with the welder to neutralize part or all of the inductive reactance, and thus to reduce the kva. demand and the line current. When series capacitors are used in this way, however, they must be protected against overvoltages. Thus, if the electrodes of the welding machine are accidently short-circuited together, the current may rise to high values, and since this current flows through the capacitor, the voltage across the capacitor may become high enough to damage it. It is necessary, therefore, to protect the capacitor against being subjected to such overvoltages, and the protective means must operate substantially instantaneously upon the occurrence of the excess current, since capacitors can not withstand extremely high voltages even momentarily without being damaged.

Heretofore, series capacitors used with resistance welders have been protected by spark gap devices, usually with a trigger circuit for initiating the discharge in the gap, and with associated contactors and other equipment, the general arrangement being similar to that used for protecting series capacitors in transmission or distribution lines. Protective equipment of this type is satisfactory in operation, but its cost is quite high as compared to the cost of a capacitor of the size required for use with a welder, and such equipment occupies a disproportionately large amount of space. Thus, in some installations the cost of the protective equipment is as great as that of the capacitor itself, or even greater, and it occupies as much space as the capacitor, and sometimes more. For these reasons, the spark gap type of

2 protective equipment is not entirely satisfactory for series capacitors used with welders.

The principal object of the present invention is to provide a protective system for series capacitors used with welders which is relatively inexpensive and compact.

Another object of the invention is to provide protective means for series capacitors used with resistance welders which operates to stop the flow of current to the capacitor substantially instantaneously upon the occurrence of a predetermined excess current, and which also interrupts the circuit of the welder.

A further object of the invention is to provide protective means for series capacitors used with resistance welders which are controlled by electronic means, the protective means operating to cause the electronic control means to stop the flow of current to the capacitor substantially instantaneously upon the occurrence of a predetermined excess current, and also operating to effect interruption of the circuit supplying the welder.

A still further object of the invention is to provide a protective circuit for a series capacitor connected in an alternating-current circuit, the protective circuit operating in response to a predetermined excess current to produce a control voltage which can be utilized to effect interruption of the current in the alternating-current circuit.

A more specific object of the invention is to provide a protective circuit for a series capacitor connected in an alternating-current circuit, such as an electronically controlled resistance welder, the protective circuit including means for applying a voltage to a control circuit and electronic means which normally prevents application of the voltage to the control circuit but which causes the voltage to be applied to the control circuit in response to a predetermined excess current in the alternating-current circuit.

The invention will be more fully understood from the following detailed description, taken in connection with the accompanying drawing, the single figure of which is a wiring diagram showing a preferred embodiment of the invention.

The drawing shows the invention applied to an electronically controlled resistance welder comprising a welding transformer 1 having a primary winding 2 and a secondary winding 3 which is connected to the welding electrodes 4 which engage the work 5. The primary winding 2 of the welding transformer 1 is connected to an alternating-current supply circuit 6 by means of a circuit breaker 7, which is shown as being of the latching type, with a closing coil 8 and a trip coil 9. A capacitor 10 is connected in series with the primary winding 2 of the welding transformer to neutralize part or all of the inductive reactance of the circuit, and thus to reduce the severity of the voltage fluctuations produced by the welder in the supply circuit 6.

The current supply to the welding transformer 1 is controlled by a pair of electric valve devices 11 and 12. These valve devices may be of the ignitron type and are oppositely connected in parallel, so as to be alternately conductive on successive half-cycles of the alternating-current supply. The valve devices 11 and 12 have anodes 13 and 13', respectively, mercury pool cathodes 14 and 14', respectively, and igniter electrodes 15 and 15', respectively.

The operation of the valve devices 11 and 12 is controlled by electronic tubes 16 and 17, respectively, each of which controls the conductivity of its associated valve device. The tubes 16 and 17 may be of the thyratron type and have anodes 18 and 18', respectively, cathodes 19 and 19', respectively, and control electrodes or grids 20 and 20', respectively. A bias voltage is applied to the control electrode 20 of the tube 16 by means of a transformer 21, which has its primary winding 22 connected across the supply line 6. The secondary winding 23 of the transformer 21 is connected across a capacitor 24, the current to the capacitor being rectified by a rectifier 25. The voltage across the capacitor 24 is applied to a resistor 26 which is connected in series with a resistor 27 and a resistor 28. The three resistors are connected across a capacitor 29 and the voltage of the capacitor 29 is applied across the cathode 19 and control electrode 20 of the tube 16.

The voltage across the resistor 26 normally maintains the control electrode 20 negative with respect to the cathode 19, so that the tube 16 is normally non-conductive. When it is desired to make the electric valve 11 conductive, a voltage is applied across the resistor 27, by means described hereinafter, which overcomes the negative bias on the control electrode 20 and fires the tube 16, or makes it conductive. This energizes the igniter electrode 15 of the valve 11 and makes the valve conductive, to permit current to flow to the welding transformer 1. The tube 17 is controlled in the same manner to control the valve 12, and the control circuit for the tube 17 is identical to that for the tube 16, the corresponding elements of the circuit being designated by primed reference numerals.

The operation of the welder is controlled by a welding timer 30, a heat control circuit 31, and a protective circuit 32 for protecting the capacitor 10 against dangerous overvoltages. The effects of these three controlling circuits are combined by an intermediate control circuit 33, which directly controls the thyratron tubes 16 and 17.

The welding timer 30 may be any suitable type of timer circuit, and has not been shown in detail since such circuits are well known in the art. A suitable timing circuit is shown, for example, in a Gulliksen Patent, No. 2,303,453, issued December 1, 1942, although it will be apparent that any other suitable timing circuit might be used. The welding timer 30 is supplied by means of the conductors 35 from the supply circuit 6, and produces an output voltage across the output leads 36. The voltage across the leads 36 is a unidirectional voltage which reverses in polarity at intervals determined by the adjustment of the timer, to time the periods of operation of the welder.

The protective circuit 32, which will be described in detail hereinafter, produces a voltage which is connected in series with the output voltage of the timer 30, and which under normal conditions is so low that it has no effect on the operation of the system.

The heat control circuit 31 may be any suitable type of heat control circuit known in the art, and operates to produce a voltage peak, or impulse, in each half-cycle of the supply voltage at a predetermined point in the voltage wave, determined by the adjustment of the circuit. The heat control circuit 31 is energized from a secondary winding 37 of a transformer 38, which has its primary winding 39 connected across the supply circuit 6. The heat control circuit 31 operates to produce voltage peaks of one polarity across the output leads 40, and voltage peaks of the opposite polarity on succeeding half-cycles across the output leads 41.

As stated above, the effects of the timing, heat control and protective circuits are combined by the intermediate control circuit 33, which directly controls the tubes 16 and 17. The intermediate control circuit 33 is fully described and claimed in a copending application of E. C. Hartwig, Serial No. 642,041, filed January 18, 1946, and assigned to Westinghouse Electric Corporation. This circuit includes an electronic tube 42 which has an anode 43, a cathode 44 and a control electrode or grid 45. The voltage across the output leads 36 of the welding timer 30 is applied, in series with a resistor 46, to a capacitor 47 which is connected across the cathode 44 and control electrode 45, so that the conductivity of the tube 42 is determined by the polarity of the voltage supplied from the timer. The anode-cathode circuit of the tube 42 includes a capacitor 48, a resistor 49, a portion of a secondary winding 50 of the transformer 38, and a capacitor 51.

The intermediate control circuit 33 also includes an electronic tube 52 having an anode 53, cathode 54 and control electrode or grid 55. A bias voltage is applied to the control electrode 55 of the tube 52 by means of a secondary winding 56 on the transformer 38, the output of which is rectified by a rectifier 57 and applied to a capacitor 58. The voltage across the capacitor 58 is applied to a resistor 59, which is connected in series with another resistor 60 and the capacitor 48 across a capacitor 61, which is connected between the cathode 54 and the control electrode 55. The anode-cathode circuit of the tube 52 includes a capacitor 62, which is charged when the tube 52 is in a conductive condition.

The circuit 33 also includes an electronic tube 65 which has an anode 66, a cathode 67, and a control electrode or grid 68. The tube 65 is controlled by means of a bias voltage applied to its control electrode 68 from a portion of the secondary winding 50 of the transformer 38, the voltage of the winding 50 being rectified by a rectifier 69 and applied to a capacitor 70 which is connected across a resistor 71. The resistor 71 is connected in series with a resistor 72 and a resistor 73 across a capacitor 74 connected between the cathode 67 and control electrode 68 of the tube 65. Another electronic tube 75, having an anode 76, cathode 77 and control electrode or grid 78, is also included in the circuit 33, and is controlled by means of a bias voltage applied to its control electrode 78 from a secondary winding 79 on the transformer 38. The output voltage of the winding 79 is rectified by means of a rectifier 80 and applied to a capacitor 81 which is connected across a resistor 82. The resistor 82 is connected in series with a resistor 83 and a resistor 84 across a capacitor 85 connected between the control electrode 78 and the cathode 77 of the tube 75.

The operation of the intermediate control circuit 33 is as follows. When the voltage supplied from the timer 30 is positive on the control electrode 45 of the tube 42, the tube 42 is made conductive, and current flows in its anode-cathode circuit, which extends from the anode 43 to the capacitor 48, resistor 49, secondary winding 50 of the transformer 38, conductor 86, conductor 87, capacitor 51, and conductor 88 to the cathode 44. Thus, the capacitors 48 and 51 are charged by the voltage of the secondary winding 50 to voltages determined by their respective capacitances. The voltage across the output leads 40 of the heat control circuit 31 is applied across the resistor 72 in the grid circuit of the tube 65, and when a voltage peak, or impulse, occurs across the resistor 72, it overcomes the negative bias voltage on the grid 68 of the tube 65 and fires this tube, or makes it conducting. When this occurs, the capacitor 51 discharges through the anode-cathode circuit of the tube 65, which includes the primary winding 89 of a transformer 90. This pulse of current in the primary winding 89 induces a voltage in the secondary winding 91, which is applied by means of the conductors 92 to the resistor 27 in the control circuit of the tube 16, overcoming the bias voltage on the control electrode 20 of that tube and making it conductive so that it fires the corresponding valve device 11.

While this is occurring, the voltage of the capacitor 48, which is charged in series with the capacitor 51, has risen to a high enough value to overcome the voltage across the resistor 59, and makes the control electrode 55 of the tube 52 positive, firing that tube. When the tube 52 is fired, current flows in its anode-cathode circuit, extending from the anode 53 through the conductor 93, conductor 94, capacitor 62, conductor 87, conductor 86, secondary winding 50 of transformer 38, resistor 49, and capacitor 48 to the cathode 54. Thus, the capacitor 62 is charged by the voltage of the secondary winding 50.

The voltage produced by the heat control circuit 31 across the leads 41 is applied across the resistor 83 in the grid circuit of the tube 75, and when a voltage peak, or impulse, occurs across this resistor on the following half-cycle, it overcomes the bias voltage across the resistor 82, and makes the tube 75 conductive. When the tube 75 is fired in this way, the capacitor 62 discharges through its anode-cathode circuit, which includes the primary winding 95 of a transformer 96. The secondary winding 97 of the transformer 96 is connected across the resistor 27' in the grid circuit of the tube 17, and when the capacitor 62 discharges through the primary winding 95, a voltage pulse occurs in the secondary 97, which is applied across the resistor 27', and which overcomes the bias voltage on the resistor 26', and makes the tube 17 conductive to fire the valve device 12.

The operation described above is repeated continuously on successive half-cycles of the supply voltage as long as the voltage of the welding timer 30 is positive on the control electrode 45 of the tube 42, and is stopped when the timer voltage reverses and makes the control electrode 45 negative. Thus, the operation of the intermediate control circuit 33 is, in general, to cause the valve devices 11 and 12 to become alternately conductive on successive half-cycles at points on the voltage wave of the supply voltage determined by the heat control circuit 31, and for periods of time determined by the adjustment of the welding timer 30. For a more complete description of the intermediate control circuit 33 and its advantages, reference is made to the above-mentioned Hartwig application.

As previously stated, it is necessary to protect the series capacitor 10 against overvoltages caused by excessive current flowing in the welding circuit. For this purpose, the protective circuit 32, to which the present invention is particularly directed, is provided. This circuit includes a current transformer 100 energized from the welding circuit. The transformer 100 may have a resistor 101 connected across it, and is connected to the primary winding 102 of a step-up transformer 103. The secondary winding 104 of the transformer 103 is connected across a capacitor 105 through a rectifier 106, and the voltage of the capacitor 105 is applied across a voltage divider 107.

The protective circuit 32 also includes an electronic tube 108 having an anode 109, a cathode 110, and a control electrode or grid 111. A bias voltage is applied to the control electrode 111 by a secondary winding 112 of a transformer 113, the primary winding 114 of which is energized from the supply circuit 6. The voltage of the secondary winding 112 is rectified by a rectifier 115 and applied to a capacitor 116 which is connected across a resistor 117. The resistor 117 is connected in series with a portion of the voltage divider 107, and with another resistor 118, across a capacitor 131, which is connected between the cathode 110 and control electrode 111 of the tube 108. The rectifiers 106 and 115 are connected so that the voltages across the resistor 117 and the voltage divider 107 oppose each other. The voltage divider 107 is adjusted so that under normal conditions, the voltage across the resistor 117 predominates, and its polarity is such that the control electrode 111 is positive, so that the tube 108 is normally maintained in a conductive condition. A voltage is applied across the anode 109 and cathode 110 of the tube 108 by means of a secondary winding 119 on the transformer 113, which is connected across the tube 108 in series with a resistor 120. A time delay relay 121 is preferably also provided, having its contacts in the anode circuit of the tube 108, and having an operating coil 122 connected across the supply circuit 6, so that when the circuit breaker 7 closes, the relay 121 closes its contacts after a short time delay which prevents the application of voltage to the anode 109 until the cathode 110 has had time to heat up.

A resistor 123 is connected across the tube 108 and a capacitor 124 is connected across the resistor 123. The voltage across the capacitor 124 is connected in series with the output voltage of the welding timer 30, which is applied to the control electrode 45 of the tube 42, the connection being made so that the voltage across the capacitor 124 is negative with respect to the control electrode 45. A relay 125 is also included in the protective circuit 32, the relay 125 having an operating coil 126 connected across the tube 108, and having normally open contacts 127 connected in series with the trip coil 9 of the circuit breaker 7.

The operation of the protective circuit 32 is as follows. The output voltage of the current transformer 100 is stepped up by the transformer 103 to a usable magnitude, and applied across the voltage divider 107. A portion of this voltage is connected in series with the bias voltage across the resistor 117 in the grid circuit of the tube 108, and opposes the bias voltage. The voltage divider 107 is adjusted so that under normal conditions, the voltage across the resistor 117 predominates and maintains the tube 108 in a conductive condition, so that current flows in its anode-cathode circuit through the resistor 120. With the tube 108 conducting, the voltage across the capacitor 124 and the relay coil 126 is very low, being only the voltage drop across the tube, and this is not high enough to affect the operation of the control circuit 33 or to operate the relay 125. A rectifier 128 is connected between the relay coil 126 and the tube 108 to prevent application of voltage to the relay coil 126 during the half-cycles of the supply voltage when the voltage of the transformer winding 119 is negative on the anode 109. A rectifier 129 is connected between the relay coil 126 and the capacitor 124 to prevent the capacitor from discharging through the relay coil, thus maintaining the capacitor voltage during the non-conductive half-cycles of the tube 108.

When the current in the welding circuit increases, the voltage across the voltage divider 107 increases, and if the magnitude of this current exceeds a predetermined value, which is determined by the adjustment of the voltage divider 107, the voltage across the portion of the voltage divider which is included in the grid circuit of the tube 108 exceeds the voltage across the resistor 117 and makes the control electrode 111 of the tube 108 negative, thus making the tube non-conductive. When this occurs, the full voltage of the secondary winding 119 is applied to the capacitor 124 and the relay coil 126. This voltage across the capacitor 124 is high enough to make the control electrode 45 of the tube 42 negative, irrespective of the polarity of the voltage supplied by the welding timer 30 and, therefore, prevents operation of the control circuit 33, and makes the valves 11 and 12 non-conductive to interrupt the current in the welding circuit. It will be apparent that this action occurs substantially instantaneously when the current in the welding circuit exceeds the predetermined value, and that the current is interrupted within a half-cycle. At the same time, the relay 125 closes its contacts 127 and energizes the trip coil 9 of the circuit breaker 7 to trip the breaker and interrupt the supply circuit so as to deenergize the welder.

Thus, the action of the protective circuit 32, in response to a predetermined excess current in the welding circuit, is to produce a voltage which is capable of being utilized as a control voltage to effect interruption of the excess current by making the valve devices 11 and 12 non-conductive. This action occurs substantially simultaneously with the occurence of the excess current and the capacitor 10 is protected against the dangerous over-voltage which would otherwise occur across it.

In the operation of the complete system, the welder is started in operation by closing the circuit breaker 7, by energizing the closing coil 8 in any suitable manner, as by a manual switch 130. When the circuit breaker 7 closes, the welding circuit is energized, and the welding timer 30 and heat control circuit 31 are energized. The coil 122 of the time delay relay 121 is also energized, and after a suitable time delay, during which the cathode 110 heats up, the relay 121 closes its contacts and connects the secondary winding 119 across the anode and cathode of the tube 108. If conditions are normal in the circuit, current flows through the welding transformer 1 under the control of the valves 11 and 12, which are controlled by the tubes 16 and 17, respectively, these tubes being controlled by the welding timer 30 and the heat control circuit 31 through the intermediate control circuit 33, in the manner previously described, the welding timer 30 determining the duration of the welding periods and of the intervening periods, and the heat control circuit 31 determining the points on the voltage wave in each half-cycle at which the valves 11 and 12 are made conductive. As long as the current in the welding circuit remains below a value which would cause a dangerous voltage to occur across the capacitor 10, the protective circuit 32 has no effect, as the tube 108 is conductive and the voltage across the capacitor 124 is too low to affect the operation of the control circuit 33. If for any reason, however, the current in the welding circuit exceeds the predetermined value for which the protective circuit 32 is set, the circuit operates in the manner described above to cause an immediate increase in the voltage across the capacitor 124 and relay coil 126, to cause the control circuit 33 to make the valves 11 and 12 non-conductive, and to cause tripping of the circuit breaker 7 to deenergize the circuit.

It should now be apparent that a protective circuit has been provided for series capacitors utilized with resistance welders, which operates to provide substantially instantaneous protection, and which is relatively inexpensive and can be made quite compact, as compared to the spark gap types of protective devices which have previously been used. The new protective system is high reliable since the tube 108 is normally conducting and, therefore, failure of the tube 108 will result in operation of the protective circuit to open the circuit breaker 7. Thus the capacitor 10 is not left unprotected in case of tube failure, and the other elements of the circuit are highly reliable devices which are not likely to give trouble in service. The protective circuit also has the advantage that it is completely isolated from any high-voltage circuit.

A particular embodiment of the invention has been illustrated and described, but it will be apparent that various modifications may be made within the scope of the invention. Thus, the protective circuit 32 may be used with other types of electronic welder control circuits, or, in general, with any type of circuit in which the voltage of the protective circuit may be utilized as a control voltage to effect interruption of the current in the protected capacitor. The invention, therefore, is not limited to the particular arrangement shown, but in its broadest aspect, it includes all equivalent embodiments and modifications which come within the scope of the appended claims.

We claim as our invention:

1. In combination, electric valve means for controlling the supply of power from a source to a load, a capacitor connected in series with said load, a control circuit for controlling the conductivity of said valve means, a protective circuit for protecting said capacitor against over-voltages, said protective circuit including an electronic discharge tube having an anode, a cathode and a control electrode, means for applying a voltage across the anode and cathode of said discharge tube, means for normally maintaining said discharge tube in a conductive condition, means for applying a voltage to said control electrode to make the discharge tube non-conductive when the current flowing to said capacitor exceeds a predetermined value, and means for applying the voltage across the discharge tube to said control circuit, the voltage across the discharge tube being great enough when the discharge tube is non-conductive to cause the control circuit to render the valve means non-conductive.

2. In combination, electric valve means for controlling the supply of power from a source to a load, a capacitor connected in series with said load, a control circuit for controlling the conductivity of said valve means, a protective circuit for protecting said capacitor against overvoltages, said protective circuit including an electronic discharge tube having an anode, a cathode and a control electrode, means for applying a voltage across the anode and cathode of said discharge tube, means for normally maintaining said discharge tube in a conductive condition, means for applying a voltage to said control electrode to make the discharge tube non-conductive when the current flowing to said capacitor exceeds a predetermined value, means for applying the voltage across the discharge tube to said control circuit, the voltage across the discharge tube being great enough when the discharge tube is non-conductive to cause the control circuit to render the valve means non-conductive, and means responsive to the voltage across the discharge tube for effecting interruption of the circuit between the source and the load when the discharge tube is non-conductive.

3. In combination, electric valve means for controlling the supply of power from a source to a load, a capacitor connected in series with said load, a control circuit for controlling the conductivity of said valve means, a protective circuit for protecting said capacitor against overvoltages, said protective circuit including an electronic discharge tube having an anode, a cathode and a control electrode, means for applying a voltage across the anode and cathode of said discharge tube, means for applying a bias voltage to said control electrode to normally maintain the discharge tube in a conductive condition, means for deriving a voltage proportional to the current flowing to said capacitor, means for applying the last-mentioned voltage to the control electrode in opposition to said bias voltage, whereby the discharge tube is made non-conductive when said current exceeds a predetermined value, and means for applying the voltage across the discharge tube to said control circuit, the voltage across the discharge tube being great enough when the discharge tube is non-conductive to cause the control circuit to render the valve means non-conductive.

4. In combination, electric valve means for controlling the supply of power from a source to a load, a capacitor connected in series with said load, a control circuit for controlling the conductivity of said valve means, a protective circuit for protecting said capacitor against overvoltages, said protective circuit including an electronic discharge tube having an anode, a cathode and a control electrode, means for applying a voltage across the anode and cathode of said discharge tube, means for applying a bias voltage to said control electrode to normally maintain the discharge tube in a conductive condition, means for deriving a voltage proportional to the current flowing to said capacitor, means for applying the last-mentioned voltage to the control electrode in opposition to said bias voltage, whereby the discharge tube is made non-conductive when said current exceeds a predetermined value, means for applying the voltage across the discharge tube to said control circuit, the voltage across the discharge tube being great enough when the discharge tube is non-conductive to cause the control circuit to render the valve means non-conductive, and means responsive to the voltage across the discharge tube for effecting interruption of the circuit between the source and the load when the discharge tube is non-conductive.

5. In combination, electric valve means for controlling the supply of power from a source to a load, a capacitor connected in series with said load, a control circuit for controlling the conductivity of said valve means, a protective circuit for protecting said capacitor against overvoltages, said protective circuit including an electronic discharge tube having an anode, a cathode and a control electrode, means for applying a voltage across the anode and cathode of said discharge tube, means for applying a bias voltage to said control electrode to normally maintain the discharge tube in a conductive condition, means for deriving a unidirectional voltage proportional to the current flowing to said capacitor, means for applying a predetermined part of the last-mentioned voltage to the control electrode in opposition to said bias voltage, whereby the discharge tube is made non-conductive when said current exceeds a predetermined value, a capacitor connected across the discharge tube, and means for applying the voltage across the last-mentioned capacitor to said control circuit, the voltage across said capacitor being great enough when the discharge tube is non-conductive to cause the control circuit to render the valve means non-conductive.

6. In combination, electric valve means for controlling the supply of power from a source to a load, a capacitor connected in series with said load, a control circuit for controlling the conductivity of said valve means, a protective circuit for protecting said capacitor against overvoltages, said protective circuit including an electronic discharge tube having an anode, a cathode and a control electrode, means applying a voltage across the anode and cathode of said discharge tube, means for applying a bias voltage to said control electrode to normally maintain the discharge tube in a conductive condition, means for deriving a unidirectional voltage proportional to the current flowing to said capacitor, means for applying a predetermined part of the last-mentioned voltage to the control electrode in opposition to said bias voltage, whereby the discharge tube is made non-conductive when said current exceeds a predetermined value, a capacitor connected across the discharge tube, means for applying the voltage across the last-mentioned capacitor to said control circuit, the voltage across said capacitor being great enough when the discharge tube is non-conductive to cause the control circuit to render the valve means non-conductive, a relay responsive to the voltage across the last-mentioned capacitor, and means actuated by said relay for effecting interruption of the circuit between the source and the load when the discharge tube becomes non-conductive.

JAMES B. OWENS.
WILLIAM E. LARGE.

REFERENCES CITED

The following references are of record in the file of this patent:

UNITED STATES PATENTS

| Number | Name | Date |
|---|---|---|
| 1,817,526 | Rudenberg | Aug. 4, 1931 |
| 2,071,860 | Stoddard | Feb. 23, 1937 |
| 2,259,331 | Vedder | Oct. 14, 1941 |
| 2,283,647 | Palmer | May 19, 1942 |
| 2,295,297 | Schneider | Sept. 8, 1942 |
| 2,326,313 | Trucksess | Aug. 10, 1943 |
| 2,372,068 | Faulk | Mar. 20, 1945 |
| 2,392,249 | Livingston | Jan. 1, 1946 |
| 2,394,084 | Livingston | Feb. 5, 1946 |
| 2,424,298 | Bailey | July 22, 1947 |
| 2,473,344 | McCown | June 14, 1949 |